C. CLARK.
WIRE STRETCHER.
APPLICATION FILED DEC. 5, 1910.
1,012,598.
Patented Dec. 26, 1911.
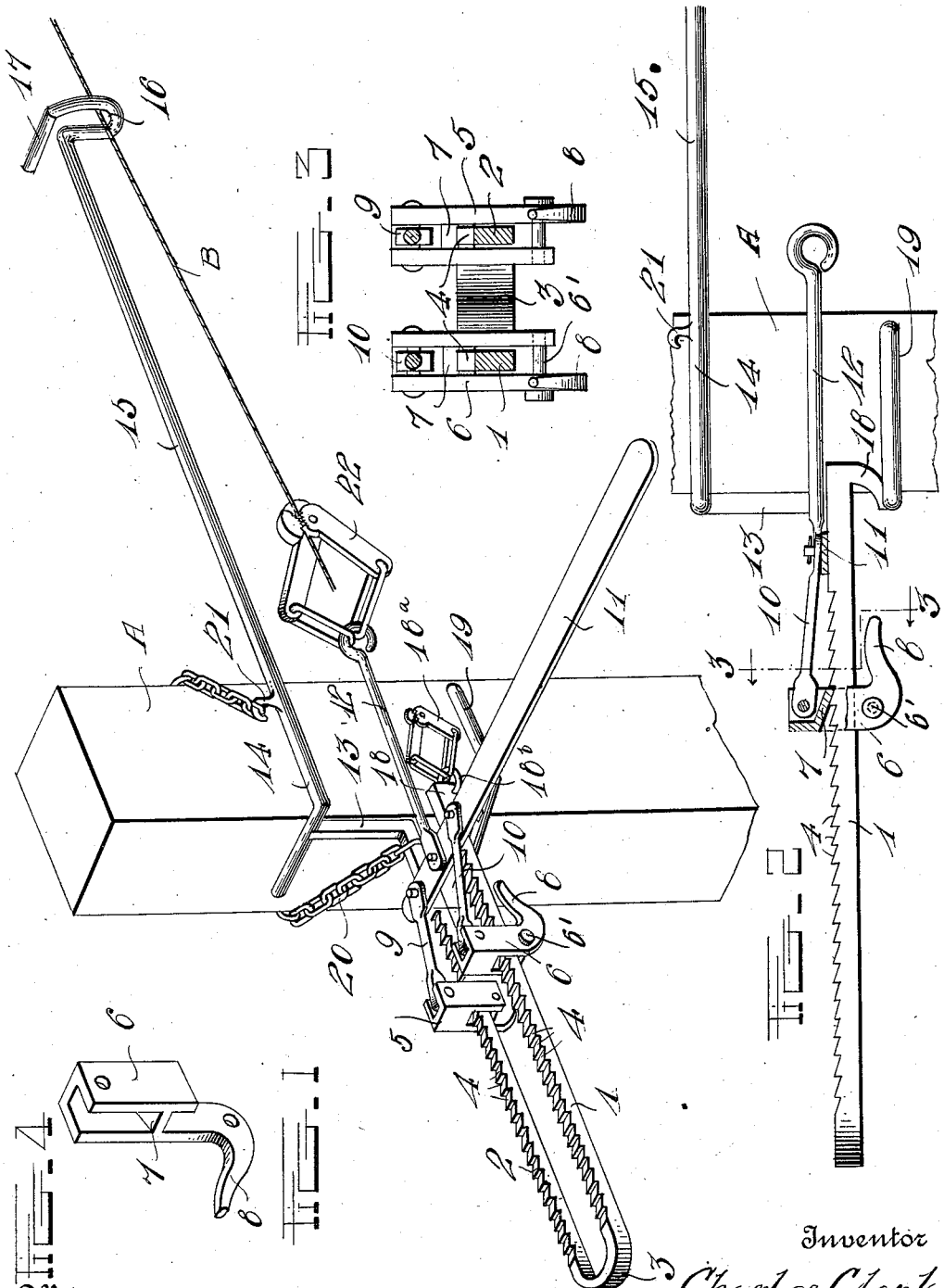
Inventor
Charles Clark
by H. B. Willson & Co.
Attorneys
Witnesses
C. R. Hardy
A. B. Hopkins

UNITED STATES PATENT OFFICE.

CHARLES CLARK, OF GUEYDAN, LOUISIANA.

WIRE-STRETCHER.

1,012,598.  Specification of Letters Patent.  Patented Dec. 26, 1911.

Application filed December 5, 1910. Serial No. 595,621.

*To all whom it may concern:*

Be it known that I, CHARLES CLARK, a citizen of the United States, residing at Gueydan, in the parish of Vermilion and State of Louisiana, have invented certain new and useful Improvements in Wire-Stretchers; and I do declare the following to be a full, clear, and exact description of the invention, such as will enable others skilled in the art to which it appertains to make and use the same.

This invention relates to wire stretchers.

The object of the invention is to provide a simple and efficient wire stretcher adapted to be supported on posts of varying sizes to which the wires are designed to be secured.

Another object of the invention is to provide a stretcher of this character having means for securing it to the post on the side opposite to that from which the wire is being drawn, whereby the wire may be stretched taut, and when the desired tension is obtained the wire will be in position ready for stapling.

Another object is to provide a wire stretcher having means for securing it to a fence-post and holding it in horizontal position thereon to provide for the operation thereof by one man.

With these and other objects in view, the invention consists of certain novel features of construction, combination and arrangement of parts as will be more fully described and particularly pointed out in the appended claim.

In the accompanying drawing—Figure 1 is a perspective view of this improved stretcher applied with the post shown in dotted lines; Fig. 2 is a side elevation with parts broken away; Fig. 3 is a transverse vertical section thereof taken on the line 3—3 of Fig. 2; Fig. 4 is a perspective view of one of the gripping members detached.

In the embodiment illustrated a wire stretcher is shown comprising two parallel bars 1 and 2, connected, preferably at one end, by a cross-bar 3, and each provided on its upper face with a series of ratchet teeth as 4.

Two gripping members 5 and 6 are slidably mounted on the bars 1 and 2 and are preferably constructed as shown in detail in Fig. 4, each having a depending pawl 7 for engagement with the teeth 4 to permit its respective member to move in one direction and to hold it against movement in the other direction. These gripping members 5 and 6 are each provided on their lower ends with releasing fingers as 8, which are preferably curved upwardly as shown, and are designed to be pressed upwardly to release the pawl 7 from the teeth 4 and permit the member to be moved on its bar into the position desired, and which is especially useful when returning the gripping members to initial position after a wire has been stretched. These gripping members 5 and 6 are provided with transversely extending pins or bolts 5' and 6' which are designed to hold the members in operative position on their respective bars and prevent their accidental detachment therefrom. Two links 9 and 10 are pivotally connected at one end with the gripping members 5 and 6, preferably at their upper ends, and at their other end are pivotally connected with one end of an operating lever 11. These links 9 and 10 are spaced longitudinally from each other on the lever 11, and a rod 12 is pivotally connected at one end with said lever between said links, said rod 12 being preferably bifurcated at its connecting end to straddle the lever 11, but it may be connected thereto in any other suitable or desired manner.

The bar 2 is provided at its free end with a right-angular upwardly extending arm 13, to the free end of which is connected a substantially L-shaped post-engaging bracket 14. This bracket 14 is provided with an extension 15, which is designed to project beyond the post A with which the stretcher is to be engaged, and is provided at its free end with a loop 16 to receive the wire B. This engagement of the member 15 with the wire B serves to hold the stretcher against twisting on the post A when pull is exerted on the lever 11. The loop 16 is preferably constructed in the form of a depending U-shaped member having a lateral arm 17 extending from the free end thereof and projecting over the member 15 to provide a closure for the upper end of the loop to prevent the wire from becoming disengaged should the wire be bent up or down or sidewise. This arm 17 is, of course, spaced slightly above the member 15 to provide for the ready insertion of the wire therethrough.

The bar 1 is provided at its free end with a depending arm 18, to the free end of which is secured an L-shaped post-engaging bracket 19, similar to the bracket 14 above described, and which is designed for the same purpose. These brackets are spaced vertically, and the bars 1 and 2 project laterally from between them. A wire clamp 18ª is also connected with the arm 18 preferably by a ring 18ᵇ and is designed to grip the wire B when it is necessary to take a new hold or to hold the wire when splicing. A chain 20 is secured at one end to the bar 1, preferably near its free end, and is adapted to be passed around the post A and be detachably engaged at its free end with a hook 21 mounted on the bracket 14. A wire-clamping member 22 is connected to the free end of the rod 12 and may be of any suitable or desired construction adapted to firmly grip and hold the wire to be stretched.

In the operation of this improved wire stretcher, the brackets 14 and 19 are engaged with one corner of the post A in suitable position to bring the point where it is desired to staple the wire intermediately between said brackets. The chain 20 is then passed around the post and engaged with the hook 21, and the wire B is drawn as taut as possible by hand and engaged by the clamp 22. The wire B is then raised and placed in the loop 16 and the stretcher is then ready to be actuated by exerting a pull in the rearward direction on the lever 11. This pull on the lever 11 will cause the slide or gripping member 6 to slip backward on the bar 1, while the slide 5 remains stationary and serves as a fulcrum for the lever. This rearward pull on lever 11 will cause the wire B to be stretched for about one-half the distance that the slide 6 moves on the bar 1. A forward pull is then exerted on the lever 11, which causes the slide 5 to move backward on the bar 2, slide 6 remaining stationary and serving as a fulcrum for the lever. It will thus be observed that each of the gripping members or slides serves alternately as a fulcrum for the lever 11. When the wire has been stretched to the desired tension it may be readily stapled to the post by one man, as the stretcher will remain in horizontal position without holding it.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

Having thus described my invention, what I claim is:—

A wire stretcher comprising toothed bars, pawls slidably engaging with the latter, an operating lever, links connecting said pawls with the lever, a rod attached to the said lever between the links and having a wire gripping device at its free end, a post engaging extension forming a part of one of said bars, an upwardly projecting post engaging extension forming a continuation of the other bar, a bracket projecting from said last named extension and having a wire receiving loop, and a chain embracing said post, one end of which is secured to one bar and having its opposite end detachably secured to a hook forming a part of the bracket.

In testimony whereof I have hereunto set my hand in presence of two subscribing witnesses.

CHARLES CLARK.

Witnesses:
A. K. RAMSY,
O. M. JONES.

---

Copies of this patent may be obtained for five cents each, by addressing the "Commissioner of Patents, Washington, D. C."